United States Patent
Lu et al.

(10) Patent No.: US 10,148,091 B2
(45) Date of Patent: Dec. 4, 2018

(54) HIGH VOLTAGE DIRECT CURRENT POWER TRANSMISSION SERIES VALVE GROUP CONTROL DEVICE

(71) Applicants: NR ELECTRIC CO., LTD., Nanjing, Jiangsu (CN); NR ENGINEERING CO., LTD., Nanjing, Jiangsu (CN)

(72) Inventors: Dongbin Lu, Jiangsu (CN); Yongping Wang, Jiangsu (CN); Zhenxi Wang, Jiangsu (CN); Qiang Zou, Jiangsu (CN)

(73) Assignees: NR ELECTRIC CO., LTD., Nanjing, Jiangsu (CN); NR ENGINEERING CO., LTD., Nanjing, Jiangsu (CN)

( * ) Notice: Subject to any disclaimer, the term of this patent is extended or adjusted under 35 U.S.C. 154(b) by 33 days.

(21) Appl. No.: 15/541,807

(22) PCT Filed: Jan. 21, 2016

(86) PCT No.: PCT/CN2016/071587
§ 371 (c)(1),
(2) Date: Jul. 6, 2017

(87) PCT Pub. No.: WO2016/116057
PCT Pub. Date: Jul. 28, 2016

(65) Prior Publication Data
US 2018/0006462 A1    Jan. 4, 2018

(30) Foreign Application Priority Data
Jan. 21, 2015    (CN) .......................... 2015 1 0031861

(51) Int. Cl.
*H02J 3/36* (2006.01)
*H02M 1/088* (2006.01)
(Continued)

(52) U.S. Cl.
CPC ............... *H02J 3/36* (2013.01); *H02M 1/081* (2013.01); *H02M 1/088* (2013.01); *H02M 7/19* (2013.01);
(Continued)

(58) Field of Classification Search
CPC .................................. H02J 3/36; H02M 1/081
(Continued)

(56) References Cited

U.S. PATENT DOCUMENTS

| 2008/0247200 A1* | 10/2008 | Karlecik-Maier | ........ H02J 3/36 363/68 |
| 2010/0039841 A1* | 2/2010 | Rittiger | ..................... H02J 3/36 363/65 |

(Continued)

FOREIGN PATENT DOCUMENTS

| CN | 0280382 | 8/1988 |
| CN | 102253299 | 11/2011 |

(Continued)

OTHER PUBLICATIONS

International Search Report filed in PCT/CN2016/071587 dated Apr. 26, 2016.

*Primary Examiner* — Adi Amrany
(74) *Attorney, Agent, or Firm* — Rankin, Hill & Clark LLP

(57) ABSTRACT

A high voltage direct current power transmission series valve group control device, is used for regulating a series circuit having two or more valve groups provided with controllable power semiconductors respectively. Each valve group is provided with a current regulation unit and a voltage regulation unit. The current regulation unit controls a direct current current flowing through a valve group corresponding thereto, and the voltage regulation unit controls a voltage across two ends of a valve group correspond- (Continued)

ing thereto. One valve group is selected from the series valve group as a master control valve group, while the others are taken as slave control valve groups. The master control valve group selects a trigger angle output by the current regulation unit to control same, and the slave control valve group selects a trigger angle obtained after the trigger angle transmitted from the master control valve group and an output value of the voltage regulation unit pass through a subtractor to control same.

6 Claims, 2 Drawing Sheets

(51) Int. Cl.
*H02M 1/08* (2006.01)
*H02M 7/19* (2006.01)
*H02M 7/757* (2006.01)
*H02M 5/14* (2006.01)

(52) U.S. Cl.
CPC ............ *H02M 7/7575* (2013.01); *H02M 5/14* (2013.01); *Y02E 60/60* (2013.01)

(58) Field of Classification Search
USPC .......................................................... 307/82
See application file for complete search history.

(56) References Cited

U.S. PATENT DOCUMENTS

| 2011/0205771 | A1* | 8/2011 | Bernhard | H02J 3/36 363/126 |
| 2017/0353034 | A1* | 12/2017 | Lu | H02J 3/36 |
| 2018/0175739 | A1* | 6/2018 | Wang | H02H 7/26 |

FOREIGN PATENT DOCUMENTS

| CN | 102593857 | 7/2012 |
| CN | 203406607 | 1/2014 |
| CN | 104092208 | 10/2014 |
| CN | 104600738 | 5/2015 |

\* cited by examiner

HIGH VOLTAGE DIRECT CURRENT POWER TRANSMISSION SERIES VALVE GROUP CONTROL DEVICE

BACKGROUND

Technical Field

The present invention relates to the field of high voltage direct current power transmission and ultra high voltage direct current power transmission, and in particular, to a valve group voltage control device during current control over series valve group in high voltage direct current power transmission.

Background

A high voltage direct current power transmission device converts an alternating current to a direct current by using a current converter, and transmits the direct current to another current converter, so that the direct current is converted to another alternating current. The used current converter usually includes a valve group composed of controllable power semiconductors, and the power semiconductors of each valve group are connected to each other to form a six-pulse or twelve-pulse bridge. Only one valve group is usually disposed for power transmission. However, in some applications, multiple such valve groups need to be connected in series to each other.

If valve groups are connected in series to each other, currents flowing through power semiconductors of the valve groups are the same. If each valve group is provided with a current regulation unit, the current regulation units regulate a common direct current. Because there are measurement errors and regulation errors, the current regulation units output different trigger angles, and voltages of corresponding valve groups may oscillate. Consequently, a voltage difference between two valve groups may be relatively large, resulting in frequent actions of taps of current converter transformers connected to the valve groups.

To resolve the problem, it is known in the prior art to dispose a common current regulation unit on a so-called pole layer of a series valve group. A trigger angle output by the common current regulation unit is transmitted to each valve group connected in series. Optionally, the common current regulation unit may be disposed in a master control valve group, and a slave control valve group uses the trigger angle transmitted from the master control valve group. If the series valve group is connected to a same alternating current power network, because parameters of an alternating current system and current converter transformers are the same for the valve groups connected in series, a control signal output by a same current regulation unit may basically ensure voltage balance of the series valve group. If the series valve group is connected to different alternating current power networks, because parameters of alternating current systems and current converter transformers are different for the valve groups connected in series, a control signal output by a same current regulation unit cannot regulate voltage balance of the series valve group. Although a voltage difference may be reduced by using a tap of a current converter transformer, a dynamic response speed becomes slow, and a corresponding voltage difference within a regulation step of the tap of the current converter transformer cannot be eliminated.

To resolve the problem, it is known in the prior art to combine a current regulation unit with a voltage balance unit in each valve group of a series valve group, so that current regulation errors and voltage differences among the series valve group are simultaneously introduced into a PI regulator, to implement current control and balance voltages of the series valve group. No matter whether a series valve group is connected to a same alternating current power network or to different alternating power networks, voltage balance of the series valve group may be achieved by using the method. However, when a voltage collection unit is faulty and a voltage balancing unit is taken out of operation, the series valve group cannot regulate a common direct current.

Control over voltage unbalance among a series valve group cannot be implemented by using the foregoing two solutions. In a direct current power transmission system, voltages among a series valve group need to be regulated. For example, on an ultra high voltage direct current power transmission occasion in which a high voltage valve group and a low voltage valve group are connected to different alternating current power networks having different voltage grades, if a voltage between the high voltage valve group and the low voltage valve group can be regulated, power demands of the different alternating current power networks to which the high voltage valve group and the low voltage valve group are connected can be satisfied, to implement decoupling control of the different connected alternating current power networks to some degree. However, such decoupling control cannot be implemented by using the prior arts, because voltages of the valve groups connected in series are basically balanced, and currents of the serial connection are the same, and powers of the valve groups connected in series are basically the same.

SUMMARY

A technical problem to be resolved by the present invention is to provide a high voltage direct current power transmission series valve group control device, configured to regulate a valve group voltage when a high voltage direct current power transmission device of a series circuit composed of two or more valve groups that have controllable power semiconductors respectively uses current control, to implement balance or unbalance control of voltages of a series valve group.

The technical solution of the present invention is to provide a high voltage direct current power transmission series valve group control device, configured to regulate a high voltage direct current power transmission device composed of two or more valve groups that are connected in series and have controllable power semiconductors respectively, where each valve group is provided with a current regulation unit and a voltage regulation unit, the current regulation unit is configured to control a direct current flowing through a valve group corresponding to the current regulation unit, and the voltage regulation unit is configured to control a voltage across two ends of a valve group corresponding to the voltage regulation unit; one valve group is selected from the series valve group as a master control valve group, and the others are taken as slave control valve groups; the master control valve group is controlled by trigger angle which is output by the current regulation unit, while the slave control valve group is controlled by trigger angle which is output from a subtractor. The output value of the subtractors obtained by subtracting output value of the voltage regulation unit from the trigger angle transmitted from the master control valve group.

In the foregoing solution, when the two or more valve groups connected in series simultaneously operate, only one valve group is the master control valve group, and the other valve groups are the slave control valve groups; and when the master control valve group is seriously faulty or out of operation, one fault-free slave control valve group is used to substitute for master control valve group as a new master control valve group, and the remaining slave control valve groups are still slave control valve groups.

In the foregoing solution, the trigger angle transmitted from the master control valve group is obtained by direct or indirect communications between control devices in the slave control valve group.

In the foregoing solution, the current regulation unit is connected to a valve group current collection unit, and each valve group current collection unit corresponds to one valve group and is configured to determine a current flowing through the valve group; the voltage regulation unit is connected to a valve group voltage collection unit, and each valve group voltage collection unit corresponds to one valve group and is configured to determine a valve group voltage falling on the corresponding valve group.

In the foregoing solution, the voltage regulation unit has a subtractor, a reference voltage input of the subtractor is a selected voltage of the master control valve group or an unbalanced reference voltage, and a measurement voltage input of the subtractor is a voltage output by the valve group voltage collection unit to which the voltage regulation unit is connected.

In the foregoing solution, the voltage regulation unit has a PI regulator, an output of the PI regulator is connected to a negative end of one subtractor, and the trigger angle transmitted from the master control valve group is connected to a positive end of the subtractor.

Beneficial effects of the present invention: the present invention provides a high voltage direct current power transmission series valve group control device; by performing current control over the master control valve group, the slave control valve group selects a trigger angle obtained after a trigger angle transmitted from the master control valve group and an output value of the voltage regulation unit pass through a subtractor to control same, to regulate voltages between the valve groups during current control over the series valve group, thereby satisfying power regulation demands of different valve groups.

DETAILED DESCRIPTION

Figure 1:
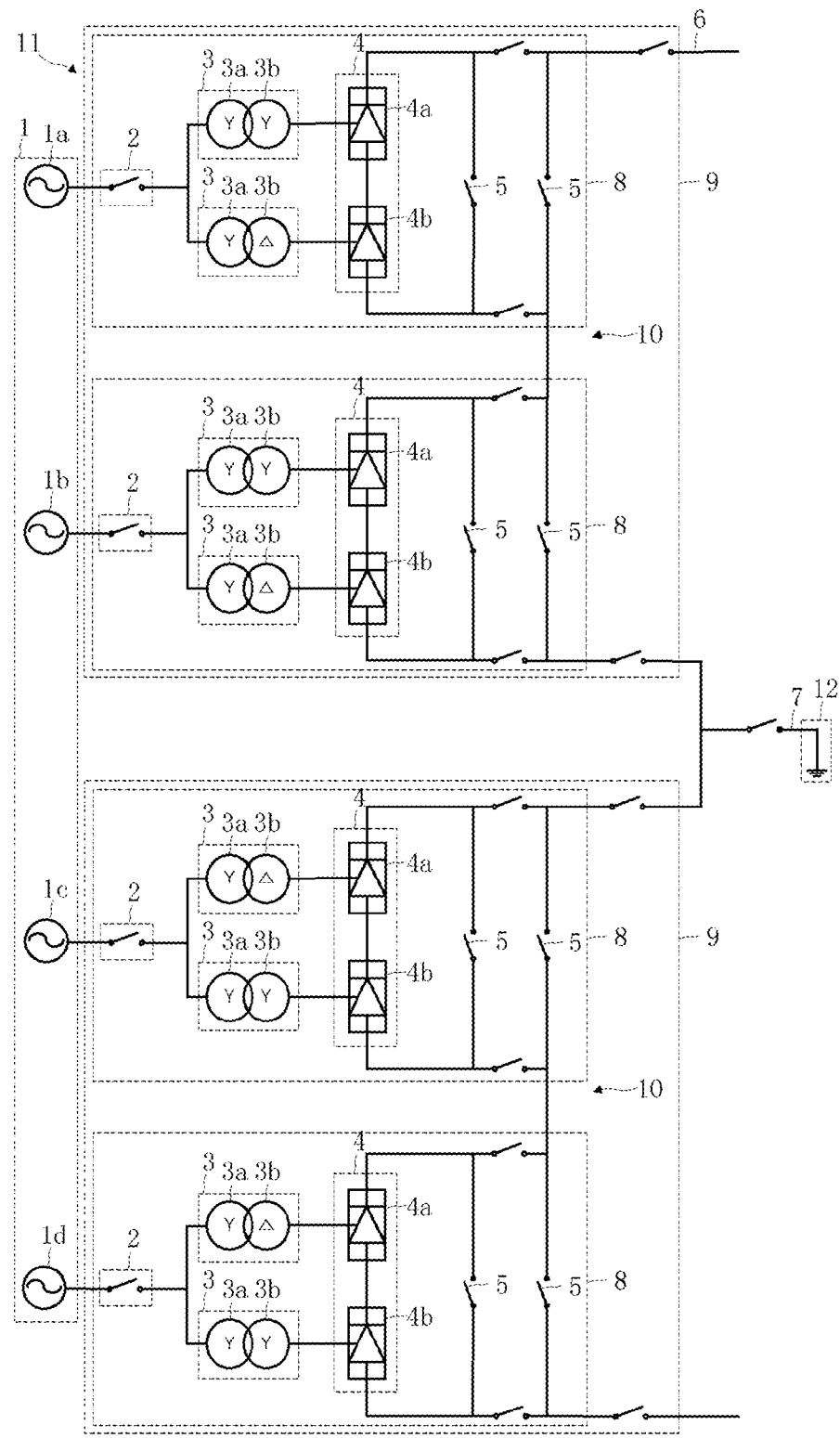
FIG. 1 is a current converter of multiple high voltage direct current power transmission valve groups connected in series.

Each valve group is provided with a current regulation unit and a voltage regulation unit. The current regulation unit is configured to control a direct current flowing through a valve group corresponding to the current regulation unit, and the voltage regulation unit is configured to control a voltage across two ends of a valve group corresponding to the voltage regulation unit. One valve group is selected from a series valve group as a master control valve group, and the others are taken as slave control valve groups. The master control valve group selects a trigger angle output by the current regulation unit to control same, and is configured to control a current flowing through a series circuit. A slave control valve group selects a trigger angle obtained after the trigger angle transmitted from the master control valve group and an output value of the voltage regulation unit pass through a subtractor to control same. The voltage regulation unit is configured to regulate a voltage of the series valve group, and an output value of the voltage regulation unit is generated by comparing a direct current voltage instruction value with a direct current voltage measurement value by a PI regulator.

According to the present invention, in an operation mode of the series valve group, the master control valve group performs current regulation, and the slave control valve group receives, by controlling direct or indirect communications between devices, the trigger angle output by the current regulation unit of the master control valve group. To regulate the voltages between the valve groups, the slave control valve group enables the voltage regulation unit disposed in the slave control valve group. The voltage regulation unit generates an output signal, and applies an output signal obtained after the output signal passes through a subtractor together with the trigger angle received from the master control valve group to voltage control of the valve group. The control signal only acts upon the corresponding slave control valve group.

For a reference voltage input of the voltage regulation unit: a. if a voltage of the master control valve group is selected, a same voltage falls on each valve group of the series valve group, that is, voltage balance regulation of the valve groups; b. if an unbalanced reference voltage is selected, a different voltage falls on each valve group of the series valve group, that is, voltage unbalance regulation of the valve groups. Voltages of the slave control valve groups are unbalanced reference voltages, and the voltage of the master control valve group is a total direct current voltage minus the voltages of the slave control valve groups.

To generate a corresponding output signal, a measurement current input of the current regulation unit is connected to a current collection unit corresponding to one valve group. A measurement signal of the current collection unit is transmitted to the current regulation unit, and a reference current input and the measurement current input pass through the subtractor and then are connected to the PI regulator to output a signal. A measurement voltage input of the voltage regulation unit is connected to a voltage collection unit corresponding to one valve group. A measurement signal of the voltage collection unit is transmitted to the voltage regulation unit, and a reference voltage input and the measurement voltage input pass through the subtractor and then are connected to the PI regulator to output a signal. The trigger angle transmitted from the master control valve group and the output of the PI regulator pass through the subtractor to generate an output, and in this way, partial voltage regulation may be implemented. Whether the foregoing sign is positive or negative is determined according to a relationship between the trigger angle and a voltage of the valve group. If the voltage of the valve group and the trigger angle show an increasing function relationship, the sign is positive. If the voltage of the valve group and the trigger angle show a decreasing function relationship, the sign is negative. A voltage regulation range needs to be determined according to a voltage-withstanding value of each valve group of the series valve group and insulation, capacity, a tap regulation scope, and the like of a current converter transformer to which the valve group is connected.

When the master control valve group is seriously faulty, the master control valve group becomes a slave control valve group, and one fault-free slave control valve group becomes a master control valve group. When the master control valve group is taken out of operation, one fault-free slave control valve group becomes a master control valve group, and the remaining slave control valve groups still are slave control valve groups. If only one valve group operates, the valve group is the master control valve group.

A high voltage direct current power transmission series valve group control device regulates, according to the foregoing method, a series circuit composed of two or more valve groups having controllable power semiconductors respectively. The power semiconductors are thyristors that cannot be controllable to turn off.

An embodiment of the present invention is described with reference to the accompanying drawings below. Same components use same reference numerals. FIG. 1 shows a current converter 11, and the current converter 11 is connected to another current converter (not shown in the figure) through a direct current line 6. The current converter 11 has two series circuits 10 composed of two valve groups 4, and the valve groups may be separately bridged by using direct current switches 5. The valve group 4 is a twelve-pulse three-phase bridge circuit. That is, the valve group 4 includes two six-pulse bridges 4a and 4b that are connected in series, and the six-pulse bridges 4a and 4b are separately connected to a high voltage direct current power transmission transformer 3. In addition, the high voltage direct current power transmission transformer 3 has a primary winding 3a connected to an alternating current power network 1. It should be noted that, the alternating current power network is three-phase, but for clarity, only one phase is shown in FIG. 1. Secondary windings 3b of the high voltage direct current power transmission transformer use star connection and delta connection, to provide a phase difference.

The current converter 11 may be disconnected from and connected to the alternating current power network 1 by using alternating current switches 2. Alternating current power networks 1a, 1b, 1c, and 1d to which a conventional ultra high voltage direct current power transmission current converter 11 is connected are a same alternating current power network. A valve group 4 connected to the direct current line 6 is referred to as a high voltage valve group, and a valve group 4 connected to a grounding line 7 is referred to as a low voltage valve group. The high-voltage and low-voltage valve groups are hierarchically connected to the ultra high-voltage direct-current power-transmission current converter 11 of different alternating current power networks. The alternating current power networks 1a and 1d to which the high-voltage valve group is connected are a same alternating current power network, and the alternating current power networks 1b and 1c to which the low-voltage valve group is connected are another alternating current power network. Each series circuit 10 composed of valve groups 4 and corresponding components such as high voltage direct current power transmission transformers, alternating current switches, and direct current switches is also represented as an electrode 9, and components corresponding to one valve group 4 form a valve group unit 8. The grounding line 7 is shown in FIG. 1, and is used to connect the current converter 11 to a grounding electrode 12.

Figure 2:
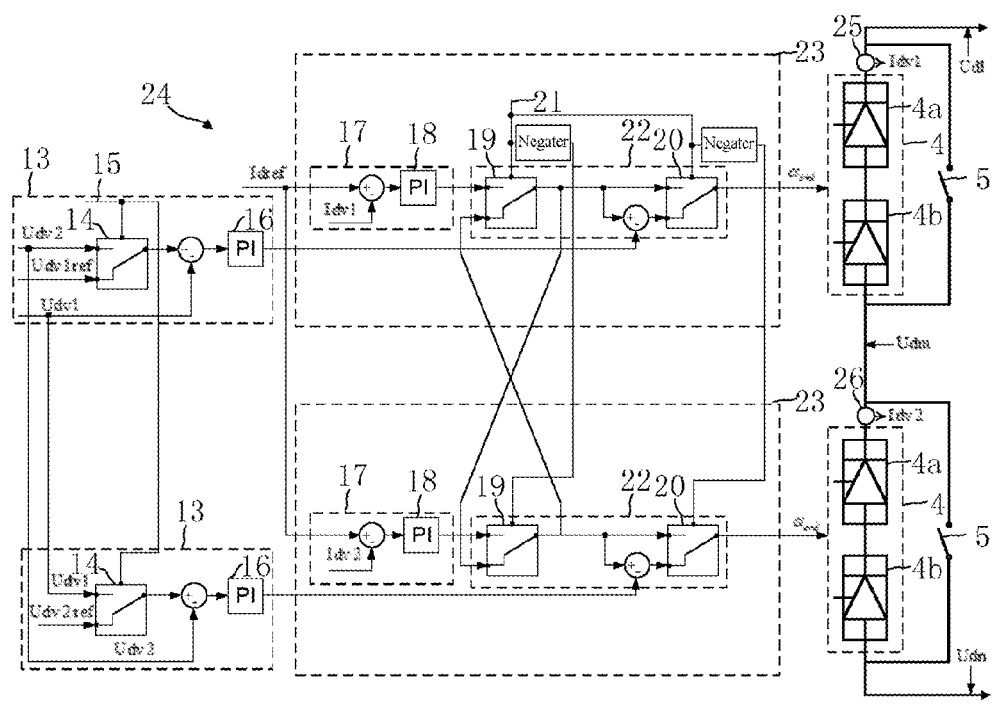
FIG. 2 is an embodiment of a device according to the present invention.

FIG. 2 shows an embodiment of a control device 24 of the present invention, and the control apparatus 24 is configured to regulate the high voltage direct current power transmission device 11 shown in FIG. 1. The control device 24 includes a current regulation unit 17, a voltage regulation unit 13, and a selection logic unit 22. The current regulation unit 17 and the selection logic unit 22 form a combination unit 23. An input of the current regulation unit 17 is a difference between a current instruction value Idref and a measured value Idv1 (Idv2), and is connected to a PI regulator 18. A reference value input of the voltage regulation unit 13 is a voltage Udv2 (Udv1) of the master control valve group or an unbalance voltage reference value Ud1vref (Ud2vref). A selection input signal of a selector 14 provides a voltage balance control/voltage unbalance control signal 15. An output of the selector 14 is compared with a voltage measurement signal Udv1 (Udv2) of a valve group, and is output to a PI regulator 16. The selection logic unit 22 includes two selectors 19 and 20. An input of the selector 19 is an output of the current regulation unit and an output of a selector 19 in another valve group, and the output of the selector 19 is connected to an input of the selector 20. Another input of the selector 20 is a subtracted value between the output of the selector 19 and an output of the voltage regulation unit 13. It should be noted that, in this embodiment, a voltage of the valve group and a trigger angle show a decreasing function relationship. Selection input signals of selectors 19 and 20 of a valve group provide a master control valve group/slave control valve group signal 21. A master control valve group/slave control valve group signal 21 is connected after a negation operation is performed on selection input signals of selectors 19 and 20 of another valve group. An output of the selector 20 is the final trigger angle $\alpha_{ord}$, and is used as a control signal of the power semiconductor.

If a high voltage valve group is the master control valve group, the selector 19 of the selection logic unit 22 in the high voltage valve group selects an output of the current regulation unit, the selector 20 selects an output of the selector 19, a value of the trigger angle $\alpha_{ord}$ is an output of a current regulator of the high voltage valve group. The selector 19 of the selection logic unit 22 in a low voltage valve group selects a trigger angle output by the selector 19 in the high voltage valve group, the selector 20 selects a subtracted value between the output of the selector 19 and an output of the voltage regulation unit 13, and a value of the trigger angle $\alpha_{ord}$ is a subtracted value between the trigger angle of the high voltage valve group and the output of the voltage regulation unit 13. If a selection input signal of the selector 14 in the low voltage valve group is voltage balance control, an output of the selector 14 is the voltage Udv1 of the high voltage valve group, is compared with the voltage measurement signal Udv2 of the low voltage valve group, and is output to the PI regulator 16, to implement voltage balance control over the valve group. If a selection input signal of the selector 14 in the low voltage valve group is voltage unbalance control, an output of the selector 14 is the unbalance voltage reference value Udv2ref, is compared with the voltage measurement signal Udv2 of the low voltage valve group, and is output to the PI regulator 16, to implement voltage unbalance control over the valve group. If the high voltage valve group is taken out of operation, the low voltage valve group becomes a master control valve group, the selector 19 of the selection logic unit 22 in the low voltage valve group selects the output of the current regulation unit, the selector 20 selects the output of the selector 19, and the value of the trigger angle $\alpha_{ord}$ is an output of the current regulator of the low voltage valve group. The foregoing implementation may be similarly applied to a case in which a low voltage valve group is the master control valve group.

A suitable measurement sensor corresponding to one valve group 4 is configured to collect actual values. For example, a current flowing through a series circuit 10 is respectively a direct current current measurement value Idv1 of a high voltage valve group and a direct current current measurement value Idv2 of a low voltage valve group. The direct current current measurement value Idv1 of the high voltage valve group and the direct current current measurement value Idv2 of the low voltage valve group are collected by respectively using a measurement sensor 25 and a measurement sensor 26, and are transmitted to the current regulation unit 17 corresponding to the valve group 4 as actual values. At three measurement positions of an electrode, a direct current bus voltage Udl of the electrode, a connection line voltage Udm of the valve group, and a neutral line voltage Udn of the electrode are collected. A measured voltage value needed by the voltage regulation unit 13 may be obtained by performing proper subtraction on the collected voltages:

The measurement of the high voltage valve group's voltageUdv1 is $$Udv1=Udl-Udm$$

and the measurement of the low voltage valve group's voltageUdv2 is $$Udv2=Udm-Udn$$

A selection input signal of a selector 14 of a voltage regulation unit provides a voltage balance control/voltage unbalance control signal 15. When the voltage reference value is the voltage of the master control valve group, the voltage regulation unit implements voltage balance control. When the voltage reference value is the unbalance reference voltage, the voltage regulation unit implements voltage unbalance control. When a voltage reference value of a slave control valve group is the voltage of the master control valve group, if the voltage of the slave control valve group is greater than the voltage of the master control valve group, a negative output signal is output from the voltage regulation unit 13. The negative output signal passes through the PI regulator 16, and is subtracted from the trigger angle output by the master control valve group and then is applied to the slave control valve group, so that a trigger angle of the slave control valve group is greater than the trigger angle of the master control valve group. The voltage of the slave control valve group reduces to the same as that of the master control valve group, to implement voltage balance control over a valve group with a control result of Udv1=Udv2. If the voltage of the slave control valve group is less than the voltage of the master control valve group, a same conclusion may be obtained. Similarly, when the voltage reference value of the slave control valve group is the unbalance reference voltage, the voltage of the slave control valve group follows the unbalance reference voltage, to implement voltage unbalance control over the valve group. A control result is that the voltage of the slave control valve group is the reference voltage value, and the voltage of the master control valve group is the direct current voltage Ud=Udl−Udn minus the voltage reference value of the slave control valve group.

Accordingly, the power of an alternating power network to which the master control valve group is connected and the power of an alternating power network to which the slave control valve group is connected may be obtained, so as to implement decoupling control over of the power of the different connected power networks to some degree.

The foregoing embodiments are merely provided to describe the technical idea of the present invention, and cannot limit the protection scope of the present invention. Any technical idea that is provided according to the present invention and any modification that is made based on the technical solutions shall fall within the protection scope of the present invention.

What is claimed is:

1. A high voltage direct current power transmission series valve group control device, configured to regulate a high voltage direct current power transmission device having two or more valve groups that are connected in series and having controllable power semiconductors respectively, wherein:

each valve group is provided with a current regulation unit and a voltage regulation unit, the current regulation unit is configured to control a direct current flowing through a valve group corresponding to the current regulation unit, and the voltage regulation unit is configured to control a voltage across two ends of a valve group corresponding to the voltage regulation unit; one valve group is selected from the series valve group as a master control valve group, and the others are taken as slave control valve groups; the master control valve group selects a trigger angle output by the current regulation unit to control same, the master control valve group is controlled by trigger angle which is output by the current regulation unit, the slave control valve group is controlled by trigger angle which is output from a subtractor, wherein the output value of the subtractor is obtained by subtracting an output value of the voltage regulation unit from the trigger angle transmitted from the master control valve group.

2. The high voltage direct current power transmission series valve group control device according to claim 1, wherein when the two or more valve groups connected in series simultaneously operate, only one valve group is the master control valve group, and the other valve groups are the slave control valve groups; and when the master control valve group is seriously faulty or taken out of operation, one fault-free slave control valve group is used to substitute for the master control valve group as a new master control valve group, and the remaining slave control valve groups are still slave control valve groups.

3. The high voltage direct current power transmission series valve group control device according to claim 1, wherein the slave control valve group receives the trigger angle transmitted from the master control valve group by direct or indirect communications between control devices.

4. The high voltage direct current power transmission series valve group control device according to claim 1, wherein the current regulation unit is connected to a valve group current collection unit, and each valve group current collection unit corresponds to one valve group and is configured to determine a current flowing through the valve group; the voltage regulation unit is connected to a valve group voltage collection unit, and each valve group voltage collection unit corresponds to one valve group and is configured to determine a valve group voltage falling on the corresponding valve group.

5. The high voltage direct current power transmission series valve group control device according to claim 4, wherein the voltage regulation unit has a subtractor, a reference voltage input of the subtractor is a selected voltage of the master control valve group or an unbalanced reference voltage, and a measurement voltage input of the subtractor is a voltage output by the valve group voltage collection unit to which the voltage regulation unit is connected.

6. The high voltage direct current power transmission series valve group control device according to claim 4, wherein the voltage regulation unit has a PI regulator, an output of the PI regulator is connected to a negative end of one subtractor, and the trigger angle transmitted from the master control valve group is connected to a positive end of the subtractor.

* * * * *